United States Patent
Chikazawa et al.

(10) Patent No.: US 11,104,383 B2
(45) Date of Patent: Aug. 31, 2021

(54) VEHICLE FRONT PORTION STRUCTURE

(71) Applicant: TOYOTA JIDOSHA KABUSHIKI KAISHA, Aichi-ken (JP)

(72) Inventors: Ryosuke Chikazawa, Toyota (JP); Hiroyuki Kurata, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 52 days.

(21) Appl. No.: 16/705,233

(22) Filed: Dec. 6, 2019

(65) Prior Publication Data
US 2020/0223488 A1  Jul. 16, 2020

(30) Foreign Application Priority Data

Jan. 16, 2019 (JP) .............................. JP2019-005334

(51) Int. Cl.
| | |
|---|---|
| *B62D 21/15* | (2006.01) |
| *B60K 5/12* | (2006.01) |
| *B62D 21/11* | (2006.01) |
| *B62D 21/09* | (2006.01) |

(52) U.S. Cl.
CPC .......... *B62D 21/155* (2013.01); *B60K 5/1216* (2013.01); *B62D 21/09* (2013.01); *B62D 21/11* (2013.01)

(58) Field of Classification Search
CPC ...... B62D 21/155; B62D 21/11; B62D 21/09; B62D 25/082; B62D 25/08; B60K 5/1216; B60K 1/02; B60Y 2306/01
See application file for complete search history.

(56) References Cited

U.S. PATENT DOCUMENTS

| | | | |
|---|---|---|---|
| 3,869,017 A * | 3/1975 | Feustel ................ | B62D 21/152 180/232 |
| 9,371,009 B2 * | 6/2016 | Ishikawa ............. | B60L 11/1898 |
| 2004/0154855 A1 * | 8/2004 | Hirayu ................ | B60K 5/1216 180/312 |
| 2007/0051549 A1 | 3/2007 | Fukuda | |
| 2013/0008735 A1 * | 1/2013 | Hiramatsu ........... | B62D 21/152 180/291 |
| 2019/0126989 A1 * | 5/2019 | Okura ..................... | B60K 1/00 |

FOREIGN PATENT DOCUMENTS

JP          2004-161260 A      6/2004

* cited by examiner

*Primary Examiner* — Darlene P Condra
(74) *Attorney, Agent, or Firm* — Hauptman Ham, LLP

(57) ABSTRACT

A vehicle front portion structure includes: a motor unit disposed at a vehicle front part; a suspension member disposed at the vehicle front part, the suspension member extending in a vehicle front-rear direction and deforming toward a vehicle lower side at a time of vehicle frontal collision; a left-right pair of front side motor mounts connecting a front part of the motor unit with the suspension member; a rear side motor mount connecting a central part, in a vehicle width direction, of a rear part of the motor unit with the suspension member; and a break mechanism that causes the rear side motor mount, which moves toward a vehicle rear side at a time of vehicle frontal collision, to break in the vehicle width direction.

5 Claims, 7 Drawing Sheets

VEHICLE FRONT PORTION STRUCTURE

CROSS-REFERENCE TO RELATED APPLICATION

This application claims priority under 35 USC 119 from Japanese Patent Application No. 2019-005334 filed on Jan. 16, 2019, the disclosure of which is incorporated by reference herein.

BACKGROUND

Technical Field

The present disclosure relates to a vehicle front portion structure.

Related Art

Japanese Patent Application Laid-Open No. 2004-161260 discloses a structure in which a motor unit is supported by a suspension member at three points: a rear motor mount and a left and right pair of front motor mounts. Further, in Japanese Patent Application Laid-Open No. 2004-161260, the rear motor mount is buckled (broken) in the vertical direction of the vehicle at a time of a frontal collision of the vehicle.

Incidentally, a motor mount needs to have sufficient strength relative to any load, in the vertical direction of the vehicle, that is input during travel or the like. Greater strength of the motor mount is established with a three-point support structure than with a structure that supports the motor unit at four points. As a result, with a three-point support structure, there is room for improvement in terms of breakage of a rear motor mount at a time of vehicle frontal collision.

SUMMARY

The present disclosure provides a vehicle front portion structure that enables breakage of a motor mount having a three-point support structure at a time of vehicle frontal collision.

A vehicle front portion structure according to a first aspect of the present disclosure includes: a motor unit disposed at a vehicle front part; a suspension member disposed at the vehicle front part, the suspension member extending in a vehicle front-rear direction and deforming toward a vehicle lower side at a time of vehicle frontal collision; a left-right pair of front side motor mounts connecting a front part of the motor unit with the suspension member; a rear side motor mount connecting a central part, in a vehicle width direction, of a rear part of the motor unit with the suspension member; and a break mechanism that causes the rear side motor mount, which moves toward a vehicle rear side at a time of vehicle frontal collision, to break in the vehicle width direction.

In the vehicle front portion structure according to the first aspect of the present disclosure, the motor unit and the suspension member are disposed at the front of the vehicle, and the suspension member extends in the vehicle longitudinal direction, and is configured to deform toward the vehicle lower side at a time of vehicle frontal collision. Further, the front portion of the motor unit and the suspension member are connected by a pair of left and right front side motor mounts, and a central part, in the vehicle width direction, at a rear part of the motor unit, and the suspension member, are connected by the rear side motor mount. Here, the rear motor mount is provided with a break mechanism, and the rear side motor mount is broken by the break mechanism at a time of a vehicle frontal collision of the vehicle. In this way, the rear side motor mount and a rear portion of the suspension member may be separated from the motor unit and displaced downward.

Further, the break mechanism breaks the rear side motor mount in the vehicle width direction as the motor unit moves toward the vehicle rear side. That is, since the rear side motor mount is broken in a different direction from a vertical load that is input during travel, the motor mount may be easily broken at a time of vehicle frontal collision even in the case of the three-point support structure.

In the vehicle front portion structure according to a second aspect of the present disclosure, in the first aspect, the rear side motor mount includes a mount main body portion fixed to the suspension member, and a mount bracket connecting the mount main body portion with the motor unit, the mount bracket includes a left-right pair of arms extending in the vehicle front-rear direction in plan view and fixed to the mount main body portion, and the break mechanism includes a projection provided at the mount main body portion, the projection contacting at least one of the arms, which move backward at a time of vehicle frontal collision, and displacing the at least one of the arms in the vehicle width direction.

In the vehicle front portion structure according to the second aspect of the present disclosure, when the arm of the mount bracket moves backward at a time of vehicle frontal collision, the arm, which has moved backward, contacts the projection provided on the mount main body portion, whereby the arm is displaced in the vehicle width direction by the projection. As a result, the arm (mount bracket) may be broken in the vehicle width direction.

In the vehicle front portion structure according to a third aspect of the present disclosure, in the second aspect, a break start point, which is a starting point of breakage in a case in which an external force acts in the vehicle width direction, is formed at the at least one of the arms.

In the vehicle front portion structure according to the third aspect of the present disclosure, when the arm contacts the projection of the mount main body portion, the arm may be broken in the vehicle width direction, starting from the break start point.

In the vehicle front portion structure according to a fourth aspect of the present disclosure, in the second aspect or the third aspect, the projection extends from the mount main body portion towards one side in the vehicle width direction, and of the left-right pair of arms, one of the arms, which faces the projection in the vehicle front-rear direction, extends further toward the vehicle rear side than the other of the arms.

In the vehicle front portion structure according to the fourth aspect of the present disclosure, the arm is easily brought into contact with the projection as a result of forming only the one arm that faces the projection so as to be longer in the vehicle front-rear direction. Moreover, weight reduction may be achieved compared with a structure in which both arms are formed so as to be long.

EFFECTS OF INVENTION

According to the vehicle front portion structure of the first aspect, in a three-point support structure, the motor mount may be broken at a time of vehicle frontal collision.

According to the vehicle front portion structure of the second aspect, the mounting bracket may be broken in the vehicle width direction via a simple structure.

According to the vehicle front portion structure of the third aspect, the mounting bracket may be broken smoothly at a time of vehicle frontal collision, as compared with a structure in which a break start point is not formed.

According to the vehicle front portion structure of the fourth aspect, it is possible to reliably break the arm while achieving weight reduction, as compared with a structure in which the left and right arm portions are formed with the same length in the vehicle front-rear direction.

BRIEF DESCRIPTION OF DRAWINGS

Exemplary embodiments will be described in detail based on the following figures, wherein.

DETAILED DESCRIPTION

In the following, a vehicle front portion structure according to an embodiment is explained with reference to the drawings. Note that arrow FR, which is illustrated appropriately in the respective drawings, indicates the vehicle forward direction, arrow UP indicates the vehicle upward direction, and arrow RH indicates the vehicle right-hand side. Hereinafter, when description is given using front-rear, left-right, and vertical directions, these refer to the front-rear of the vehicle front-rear direction, the left and right of the vehicle width direction, and the vertical of the vehicle vertical direction, unless otherwise indicated.

Figure 1:
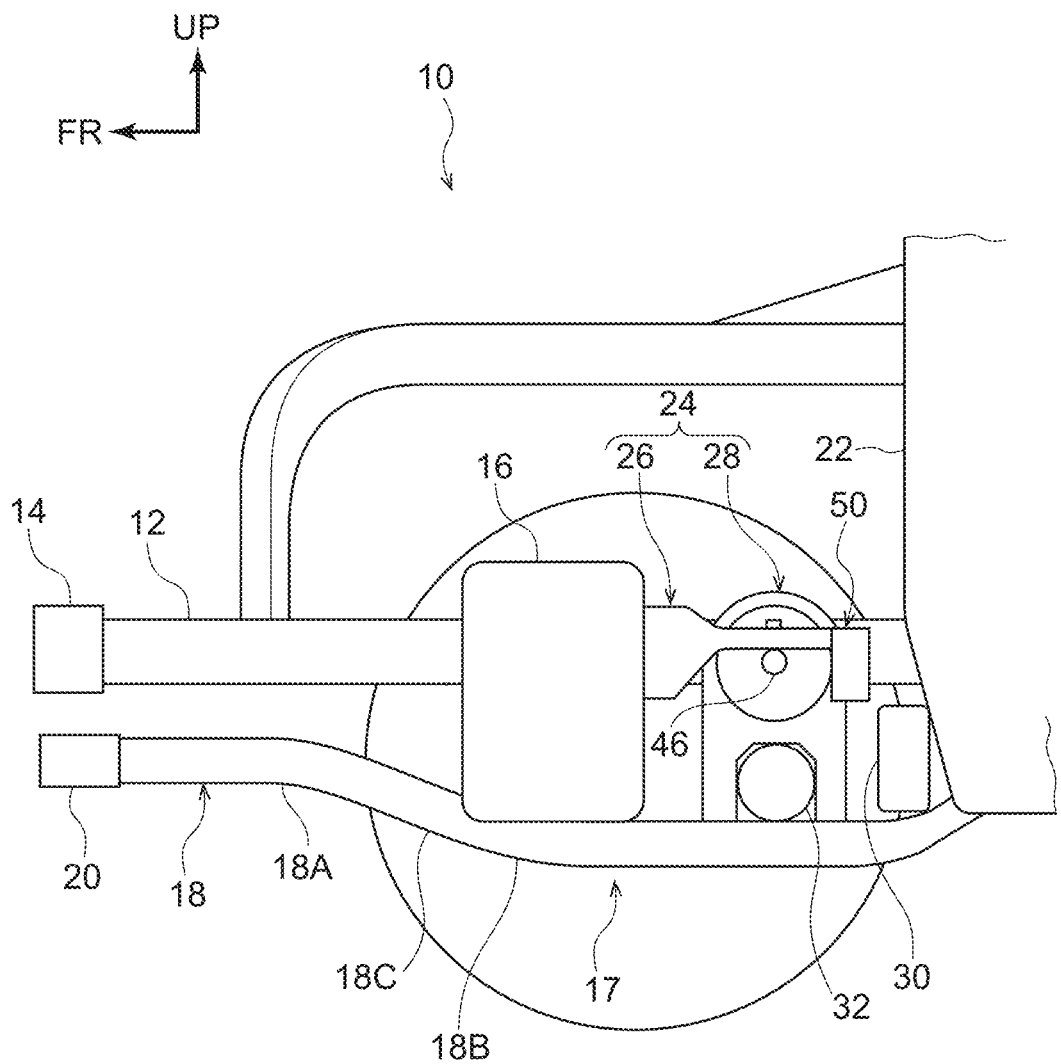
FIG. 1 is a side view illustrating a relevant part of a vehicle to which has been applied a vehicle front portion structure according to an embodiment.

As illustrated in FIG. 1, a front side member 12 extending in the vehicle front-rear direction is disposed at the front of a vehicle 10 to which the vehicle front portion structure according to the present embodiment is applied. The front side member 12 has a closed cross-sectional structure, and a pair of front side members 12 is provided on left and right sides (in FIG. 1, only the front side member 12 on the right side of the vehicle is illustrated).

A bumper reinforcement 14 is provided at the front end of the front side member 12 via a crush box (not illustrated). The bumper reinforcement 14 extends in the vehicle width direction and couples together the pair of front side members 12 in the vehicle width direction. Rear end portions of the front side members 12 are joined to dash panel 22, which separates the vehicle cabin interior from the vehicle exterior.

A high voltage cable 30, which is a high voltage component, is disposed at a lower side of a joint portion between the front side member 12 and the dash panel 22. The high voltage cable 30 is disposed along the dash panel 22, and one end of the high voltage cable 30 is connected to a battery (not illustrated) disposed below a floor panel. The other end of the high voltage cable 30 is connected to an inverter or the like (not illustrated).

Here, motor unit 16 is disposed between the left-and-right pair of front side members 12. The motor unit 16 includes a drive motor of the vehicle 10 and a transmission, and is attached to a suspension member 17, which is described below.

Figure 2:
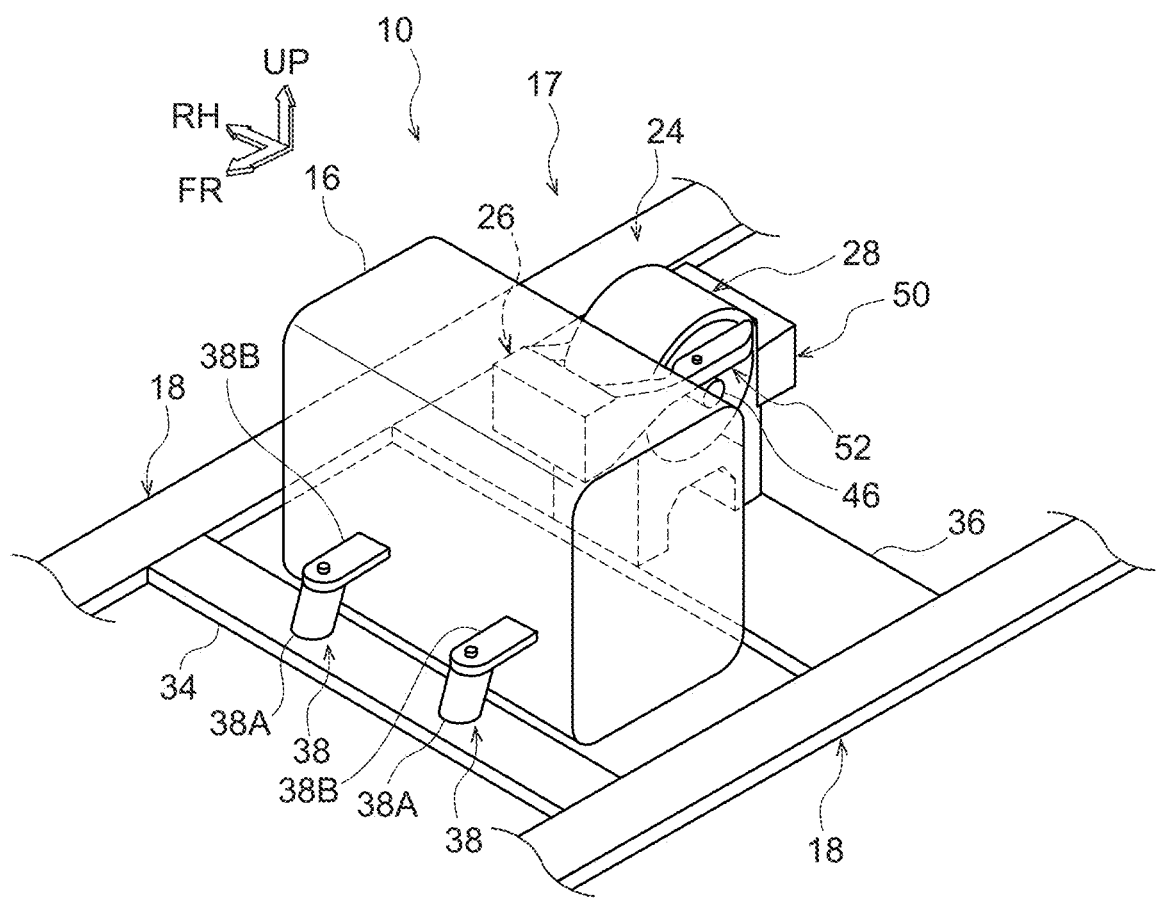
FIG. 2 is a perspective view illustrating a suspension member and a motor unit configuring a vehicle front portion structure according to an embodiment, viewed from a vehicle front side and a vehicle upper side.

Suspension member 17 is disposed at a vehicle lower side of the front side members 12. As illustrated in FIG. 2, the suspension member 17 has a pair of side rails 18, a front cross member 34, and a rear cross member 36.

The left-right pair of side rails 18 respectively extend in the vehicle front-rear direction. A lower bumper reinforcement 20 is provided at front ends of the side rails 18 as illustrated in FIG. 1. The lower bumper reinforcement 20 is located at a vehicle lower side of the bumper reinforcement 14 and extends in the vehicle width direction.

Here, a first curved portion 18A and a second curved portion 18B are formed in order, from the vehicle front side, at the side rail 18, and an inclined portion 18C is formed between the first curved portion 18A and the second curved portion 18B. The first curved portion 18A is formed between the motor unit 16 and the lower bumper reinforcement 20, and the second curved portion 18B is formed at the position of the motor unit 16. The inclined portion 18C is inclined so as to gradually approach the lower side of the vehicle on progression from the first curved portion 18A to the second curved portion 18B. Therefore, when a collision load toward the vehicle rear direction side is input to the side rail 18 at a time of vehicle frontal collision, a portion further to the vehicle rear side than the second curved portion 18B in the suspension member 17 is configured to be deformed toward the vehicle lower side.

As illustrated in FIG. 2, the motor unit 16 is supported by the suspension member 17 at three points at the front side motor mount 38 and the rear side motor mount 24. The front side motor mount 38 connects the front of the motor unit 16 to the front cross member 34 of the suspension member 17 and a pair of the front side motor mounts 38 is provided on left and right sides.

Each front side motor mount 38 includes a stay 38A standing upright at the front cross member 34 and an extension piece 38B extended from the motor unit 16. The extension piece 38B is fastened by a bolt in a state in which the extension piece 38B is superimposed on the upper end portion of the stay 38A.

Figure 3:
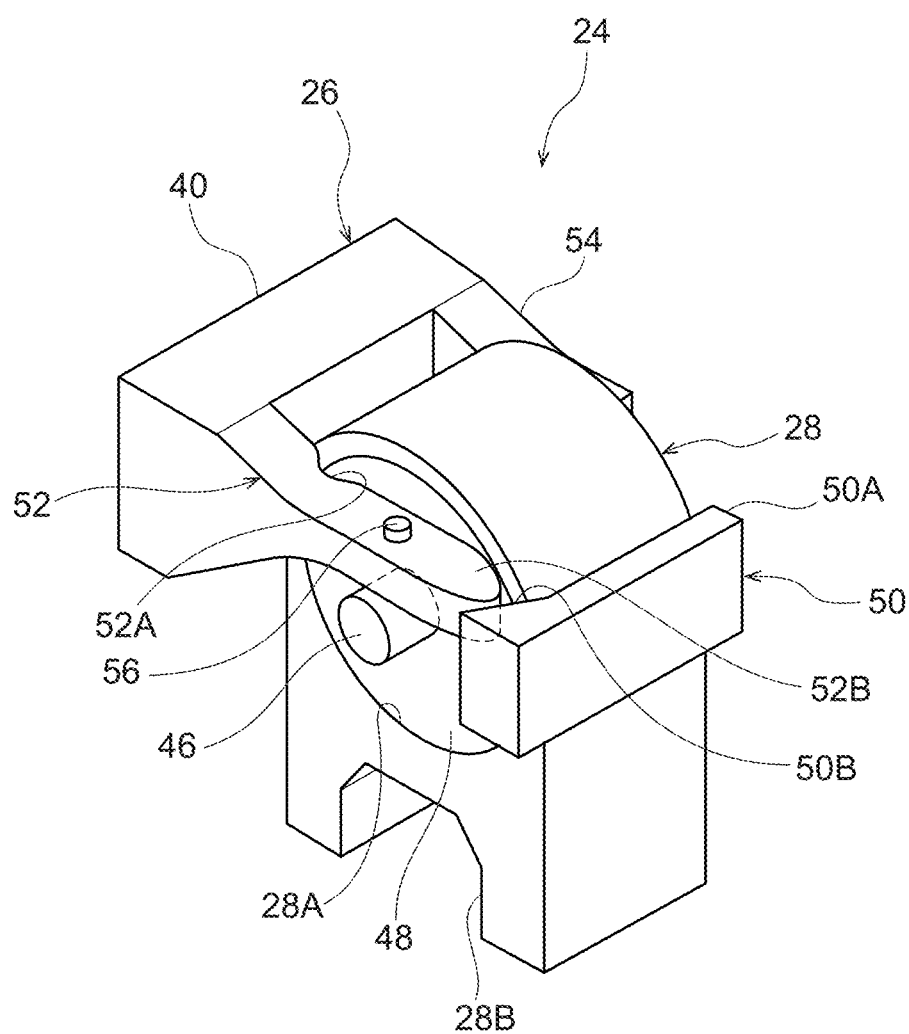
FIG. 3 is a perspective view illustrating an enlarged rear motor mount configuring a vehicle front portion structure according to an embodiment, viewed from a vehicle rear side and the vehicle upper side.

A central part, in the vehicle width direction, at the rear of the motor unit 16, and the rear cross member 36 of the suspension member 17, are connected by a rear side motor mount 24. As illustrated in FIG. 3, the rear side motor mount 24 is configured to include a mount main body portion 28 and a mount bracket 26.

The mount main body portion 28 is fixed to the rear cross member 36 of the suspension member 17 (see FIG. 2). Further, the mount main body portion 28 is formed of a metal block, and a through hole 28A penetrating in the vehicle width direction is formed in the upper part of the mount main body portion 28. A shaft 46 is inserted through the through hole 28A, and the shaft 46 extends in the vehicle width direction.

Here, a damping rubber 48 is provided between the shaft 46 and the mount main body portion 28, and the shaft 46 and the hole wall of the through hole 28A are connected by the damping rubber 48 so as to be elastically deformable. As a result, transmission of the vibration of the motor unit 16 to the suspension member 17 is suppressed.

A cut-out part 28B is formed in the lower part of the mount main body portion 28. The cut-out part 28B is formed at a central part, in the vehicle front-rear direction, of the mount main body portion 28 and is open to the vehicle lower side. Further, as illustrated in FIG. 1, a gear box 32 is disposed at the cut-out part 28B. The gear box 32 is fixed to the rear cross member 36 of the suspension member 17 (see FIG. 2).

As illustrated in FIG. 3, the mount bracket 26 is fixed to the shaft 46 of the mount main body portion 28. As illustrated in FIG. 2, the mount bracket 26 is a bracket that connects the mount main body portion 28 to the rear of the motor unit 16, and extends in the vehicle front-rear direction.

Figure 4A:
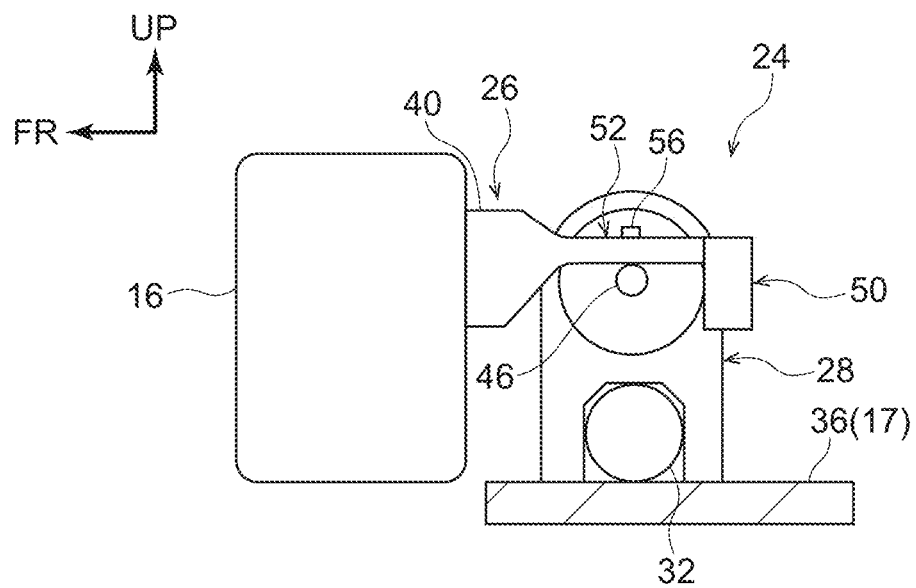
FIG. 4A is a side view illustrating a relevant part of a vehicle front portion structure according to an embodiment prior to a frontal collision.
Figure 4B:
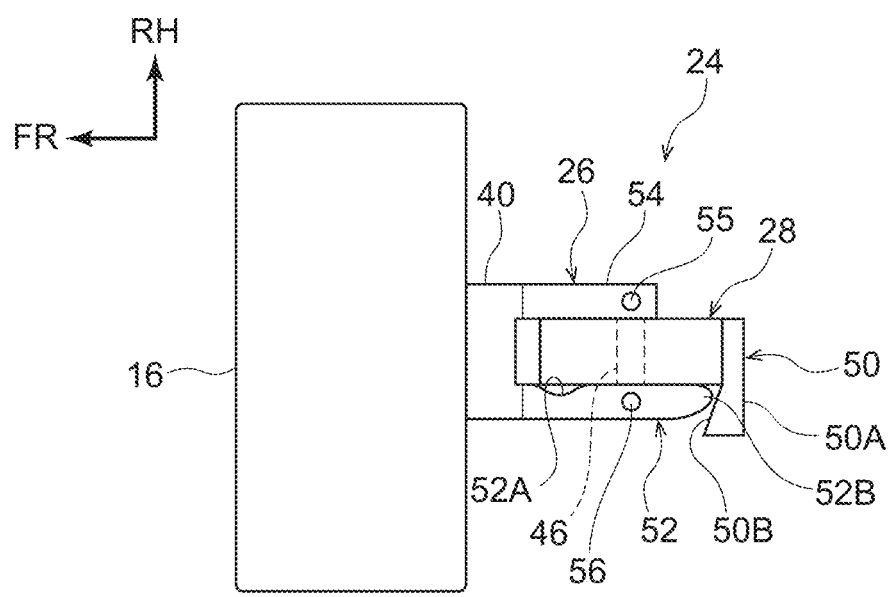
FIG. 4B is a plan view illustrating a relevant part of a vehicle front portion structure according to an embodiment prior to a frontal collision.

As illustrated in FIGS. 3 and 4B, the mount bracket 26 includes a base 40, a left arm 52 as one arm, and a right arm 54 as another arm.

The base 40 is a portion that is fixed to the motor unit 16. The base 40 is formed in a substantially rectangular shape in plan view, and extends in the vehicle width direction along the motor unit 16.

A right arm 54 extends from an end on the right side of the base 40 toward the rear of the vehicle. The right arm 54 is disposed at a side part on the right side of the mount main body portion 28 with the vehicle front-rear direction as a longitudinal direction, and a rear end part of the right arm 54 is fastened to the shaft 46 by a bolt 55.

A left arm 52 extends from an end on the left side of the base 40 toward the rear of the vehicle. The left arm 52 is disposed at a side part on the left side of the mount main body portion 28 with the vehicle front-rear direction as a longitudinal direction, and a rear part of the left arm 52 is fastened to the shaft 46 by a bolt 56. Here, the left arm 52 extends further rearward than the right arm 54, and the tip of the left arm 52 is rounded in plan view.

The left arm 52 is formed with a thin portion 52A as a break start point. The thin portion 52A is provided closer to the base 40 than the portion of the left arm 52 that is fastened to the shaft 46, and is formed by recessing the side wall on the right side of the left arm 52 toward the left. Further, this thin part 52A serves as a starting point of breakage, when an external force acts in the vehicle width direction.

Here, the mount main body portion 28 is provided with a block body 50 as a break mechanism. The block body 50 includes an attachment portion 50A attached to the rear surface of the mount main body portion 28 and a projection 50B projecting from the attachment portion 50A toward the left side of the vehicle.

The attachment portion 50A has a substantially rectangular shape in plan view, and is formed to have substantially the same width as the mount main body portion 28, with the vehicle width direction as a longitudinal direction thereof. The projection 50B extends from the end on the left side of the attachment portion 50A toward the left side of the vehicle. That is, the projection 50B extends from the mount main body portion 28 to the left side of the vehicle (one side in the vehicle width direction).

The projection 50B is disposed to face the left arm 52 of the mount bracket 26 in the front-rear direction of the vehicle. Further, the surface on the vehicle front side of the projection 50B, that is, the surface facing the left arm 52, is an inclined surface that gradually approaches the vehicle rear side on progression from the left side to the right side of the vehicle.

(Action)

The action of the present embodiment is described next.

In the vehicle front portion structure according to the present embodiment, the rear side motor mount 24 may be broken at a time of vehicle frontal collision even in the case of a three-point support structure. This action will be described together with the behavior of the vehicle 10 at a time of vehicle frontal collision.

As illustrated in FIGS. 4A and 4B, in a state before the collision, the right arm 54 and the left arm 52 of the mount bracket 26 extend in the vehicle front-rear direction substantially parallel to the mount main body portion 28. The left arm 52 faces the projection 50B of the block body 50 in the vehicle front-rear direction, and the gear box 32 is disposed between the rear cross member 36 of the suspension member 17 and the mount main body portion 28.

Figure 5A:
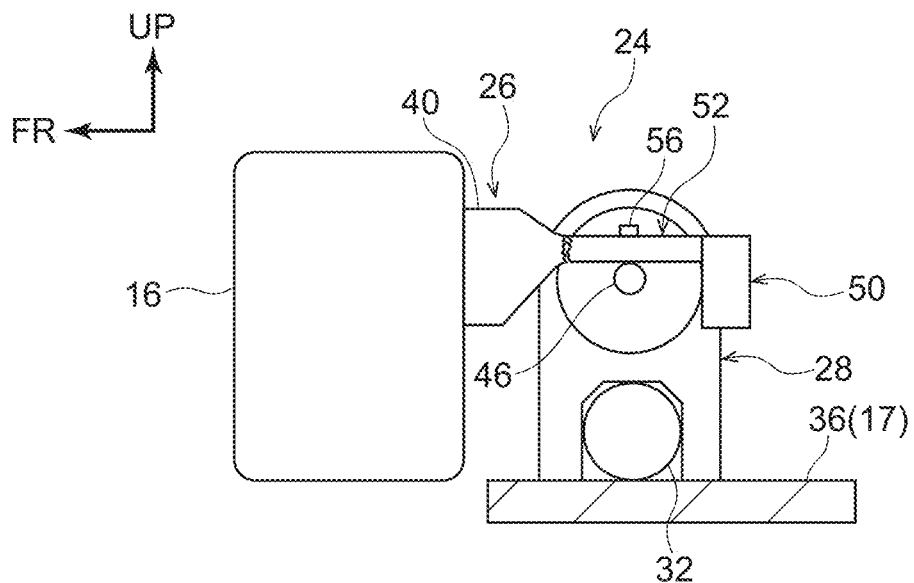
FIG. 5A is a side view illustrating a relevant part of a vehicle front portion structure according to an embodiment at a time of frontal collision.
Figure 5B:
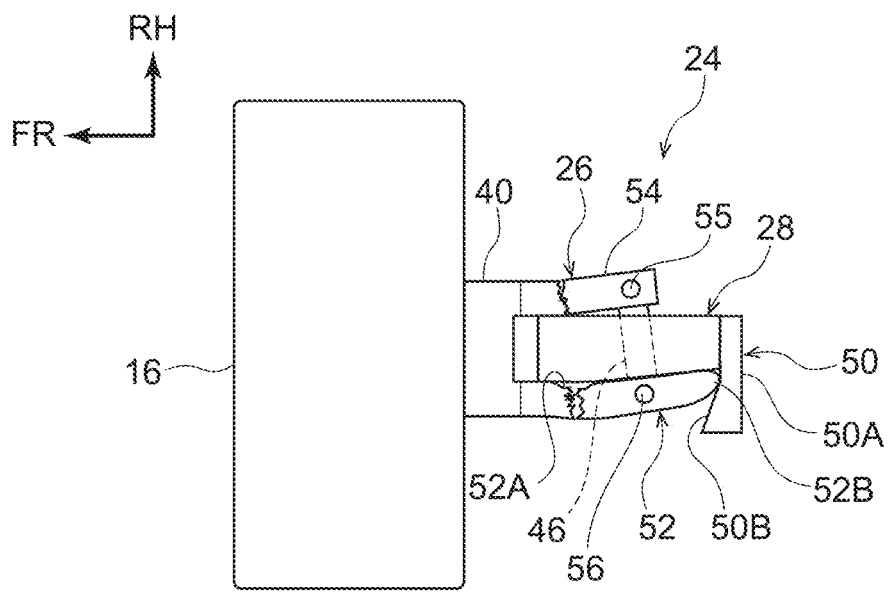
FIG. 5B is a plan view illustrating a relevant part of a vehicle front portion structure according to an embodiment at a time of frontal collision.

Next, as illustrated in FIGS. 5A and 5B, at a time of vehicle frontal collision of the vehicle 10, a collision load is input to the motor unit 16, whereby the motor unit 16 moves toward the vehicle rear side. At this time, the left arm 52 contacts the projection 50B, and the left arm 52 is displaced toward the right side of the vehicle along the inclined surface on the vehicle front side of the projection 50B. As a result of this, the left arm 52 is broken in the vehicle width direction. Here, since the left arm 52 and the right arm 54 are connected via the shaft 46, the right arm 54 is also displaced to the right side of the vehicle similarly to the left arm 52, and is broken in the vehicle width direction.

Figure 6:
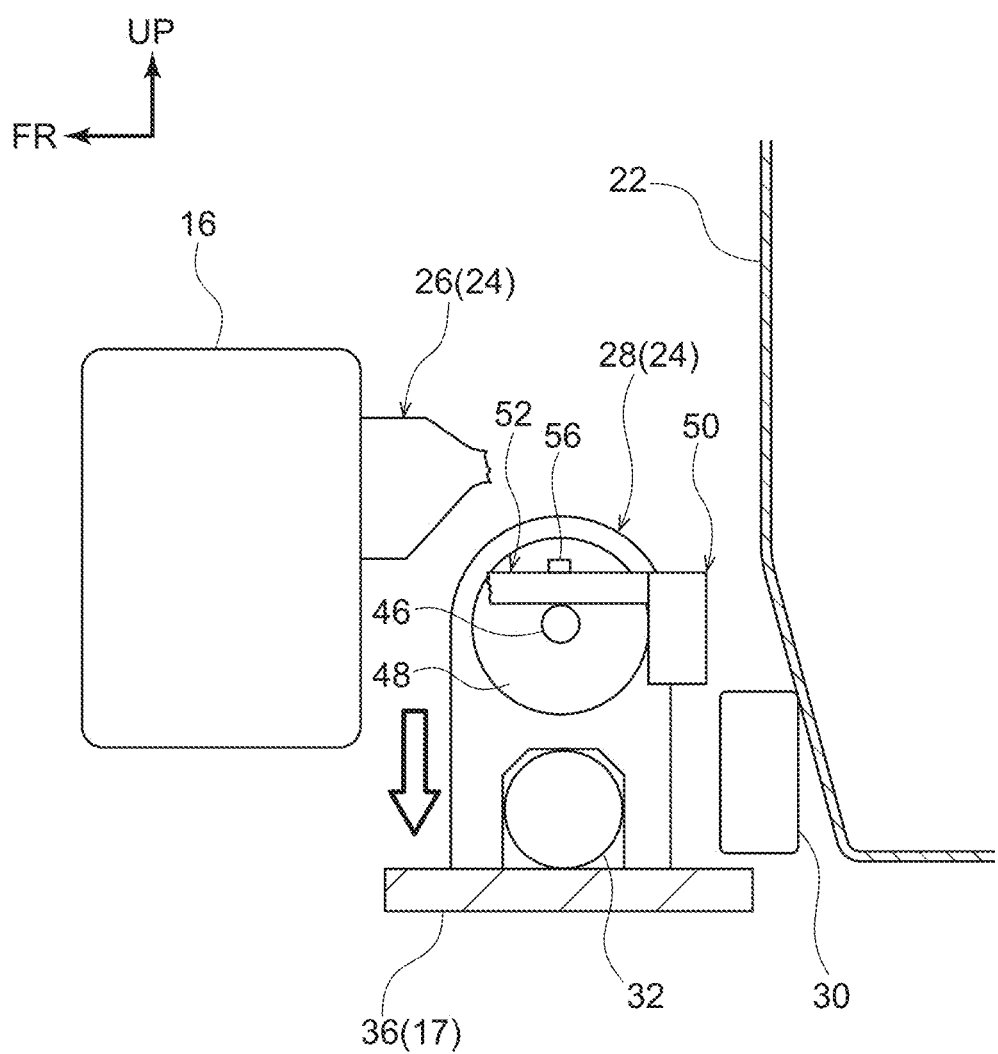
FIG. 6 is a side view illustrating a state in which the suspension member is deformed downward from the state of FIG. 5A.

The motor unit 16 is separated from the mount main body portion 28 owing to the rear side motor mount 24 being broken in the vehicle width direction. As illustrated in FIG. 1, the inclined portion 18C of the suspension member 17 is inclined so as to gradually approach the vehicle lower side on progression from the first curved portion 18A to the second curved portion 18B. Therefore, the gear box 32 and the mount main body portion 28 may be made to drop downward as illustrated in FIG. 6 as a result of, at a time of vehicle frontal collision, a portion further toward the vehicle rear side than the second curved portion 18B in the suspension member 17, being deformed toward the vehicle lower side. As a result, the vertical position of the motor unit 16 and the gearbox 32 may be altered.

Figure 7:
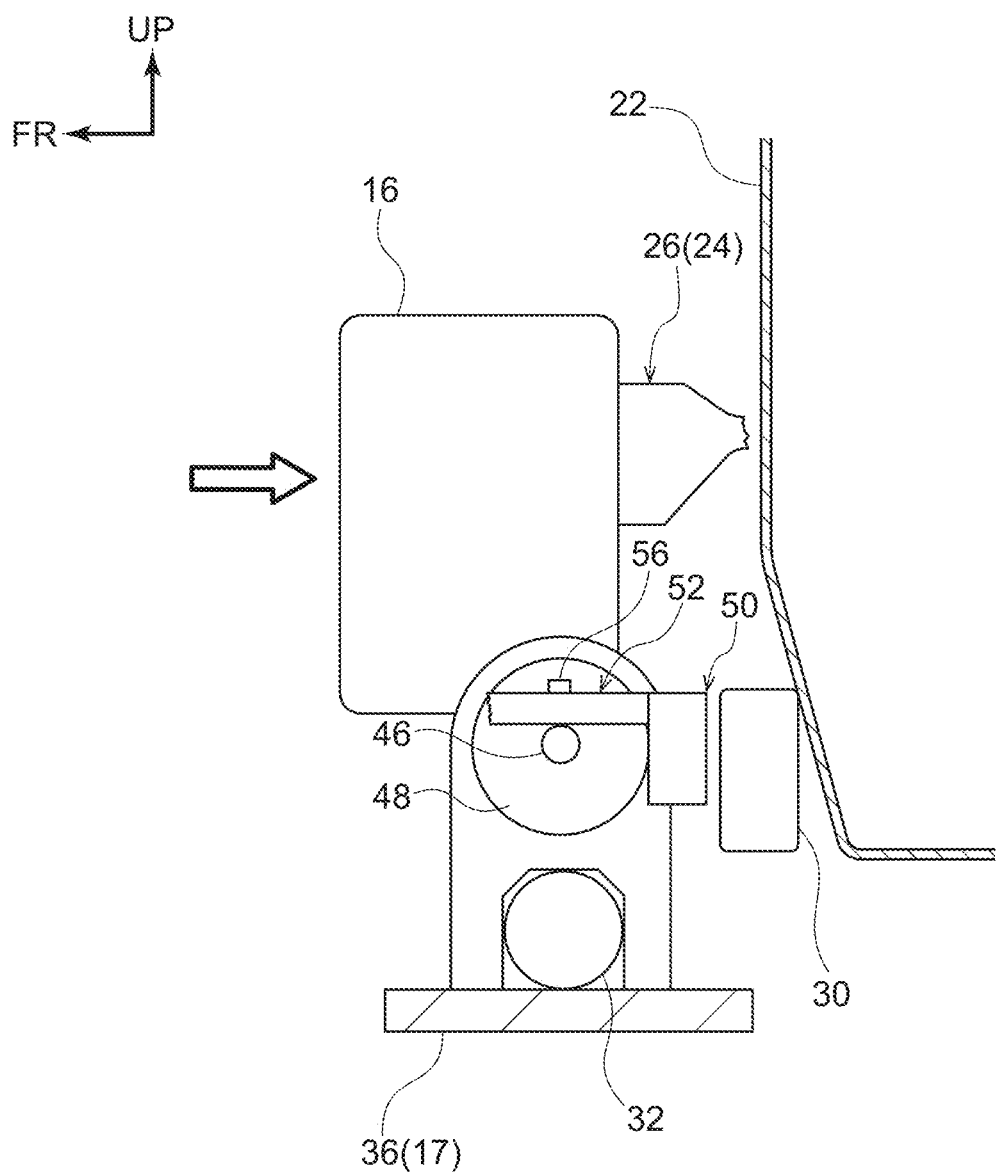
FIG. 7 is a side view illustrating a state in which the motor unit has moved to the rear side of the vehicle from the state of FIG. 6.

By displacing the motor unit 16 and the gearbox 32 in the vehicle vertical direction, the motor unit 16 moves backward toward the vicinity of the dash panel 22 as illustrated in FIG. 7, and non-crushed remainder of the front side members 12 may be minimized. That is, when the motor unit 16 and the gear box 32 are arranged side by side in the vehicle front-rear direction, it is conceivable that the front side member 12 is not sufficiently crushed by these rigid bodies, and the absorption amount of collision energy is reduced. In contrast, in the present exemplary embodiment, the vertical position of the motor unit 16 and the gearbox 32 may be altered, whereby the crushing margin of the front side members 12 may be secured.

In addition, when the gearbox 32 falls, a situation in which the high voltage cable 30 is pinched between the gearbox 32 and the dash panel 22 may be avoided. That is, when the motor unit 16 and the gear box 32 are arranged side by side in the vehicle front-rear direction, if the motor unit 16 moves backward, the high voltage cable 30 may be pinched between the motor unit 16 and the dash panel 22 via the gear box 32. In the present embodiment, the high voltage cable 30 may be prevented from being pinched in this manner.

Furthermore, in the present embodiment, as illustrated in FIG. 5B, when the motor unit 16 moves rearward, the block body 50 breaks the rear side motor mount 24 in the vehicle width direction. That is, the rear side motor mount 24 is broken in a direction that differs from the vertical load input to the rear side motor mount 24 during travel. As a result, even if the strength of the rear side motor mount 24 with respect to the load in the vertical direction of the vehicle is high, as in a three-point support structure, the rear side motor mount 24 may be easily broken at a time of vehicle frontal collision.

In particular, in the present embodiment, when the mount bracket 26 retracts at a time of vehicle frontal collision of the vehicle 10, the left arm 52 contacts the projection 50B provided on the mount main body portion 28, whereby the left arm 52 is displaced in the vehicle width direction by the projection 50B. Thereby, the left arm 52 may be broken in the vehicle width direction via a simple structure.

Further, in the present embodiment, as illustrated in FIG. 3, the thin portion 52A is formed on the left arm 52, and the left arm 52 is broken in the vehicle width direction starting from the thin portion 52A. Thus, the left arm 52 (mount bracket 26) may be broken smoothly at a time of vehicle frontal collision of the vehicle 10, as compared with a configuration in which a break start point such as the thin portion 52A is not formed in the left arm 52.

Furthermore, in the present embodiment, only the left arm 52 opposed to the projection 50B is formed so as to be long in the vehicle front-rear direction, so the left arm 52 may be easily brought into contact with the projection 50B. Further, as compared with a configuration in which the right arm 54 is formed with a similar length to the left arm 52, the weight may be reduced. That is, as compared with a structure in which the right arm 54 and the left arm 52 are formed with the same length in the vehicle front-rear direction, the left arm 52 may be reliably broken while also enabling weight reduction.

In the foregoing, a vehicle front portion structure according to an embodiment has been described; however, the present disclosure may, of course, be implemented in various forms within a scope that does not depart from the gist thereof. For example, although the front side motor mount 38 is configured to include the stay 38A and the extension piece 38B as illustrated in FIG. 2 in the above embodiment, the present invention is not limited to this. Similarly to the rear side motor mount 24, a motor mount using damping rubber may be used.

Moreover, although the block body 50 is used as a break mechanism in this embodiment, the present disclosure is not limited to this. For example, the surface of the projection 50B of the block 50 facing the left arm 52 may be a flat surface, and the tip of the left arm 52 may be inclined. In this case, when the left arm 52 and the projection 50B come into contact with each other, the left arm 52 may be displaced in the vehicle width direction and broken as in the present embodiment.

Furthermore, a structure in which the block body 50 is provided at the dash panel 22 instead of at the rear side motor mount 24 may be employed. For example, a block body may be provided at the dash panel 22 at a position facing the left arm 52 or the right arm 54 in the vehicle front-rear direction, and a surface at the vehicle front side of the block body may be inclined. In this case, when the rear side motor mount 24 moves backward together with the motor unit 16 at a time of vehicle frontal collision of the vehicle 10, at least one of the left arm 52 or the right arm 54 contacts the block body, whereby at least one of the left arm 52 or the right arm 54 may be displaced in the vehicle width direction, and the rear side motor mount 24 may be broken in the vehicle width direction.

Furthermore, in the present embodiment, the left arm 52 is extended further rearward than the right arm 54, but the present disclosure is not limited to this. For example, the right arm 54 may be extended further to the rear side of the vehicle than the left arm 52. In this case, by providing a projection on the vehicle right side of the block body 50 instead of the projection 50B on the vehicle left side, the mount bracket 26 may be broken in the vehicle width direction as in the present embodiment.

Further, in the present exemplary embodiment, the left arm 52 is formed with a thin portion 52A as a break start point, but the present disclosure is not limited to this. For example, the surface on the left side of the left arm 52 may be recessed to form a thin portion, or both the left and right portions may be recessed to form a thin portion. In addition, a structure other than the thin portion may be formed as the break start point and, for example, a groove-shaped break start point may be formed. Furthermore, when the left arm 52 may be broken in the vehicle width direction without the break start point, a structure without the break start point may be employed.

What is claimed is:

1. A vehicle front portion structure, comprising:
   a motor unit disposed at a vehicle front part;
   a suspension member disposed at the vehicle front part, the suspension member extending in a vehicle front-rear direction and deforming toward a vehicle lower side at a time of vehicle frontal collision;
   a left-right pair of front side motor mounts connecting a front part of the motor unit with the suspension member;
   a rear side motor mount connecting a central part, in a vehicle width direction, of a rear part of the motor unit with the suspension member; and
   a break mechanism that causes the rear side motor mount, which moves toward a vehicle rear side at a time of vehicle frontal collision, to break in the vehicle width direction.

2. The vehicle front portion structure recited in claim 1, wherein:
   the rear side motor mount includes a mount main body portion fixed to the suspension member and a mount bracket connecting the mount main body portion with the motor unit,
   the mount bracket is provided with a left-right pair of arms extending in the vehicle front-rear direction in plan view and fixed to the mount main body portion, and
   the break mechanism includes a projection provided at the mount main body portion, the projection contacting at least one of the arms, which move backward at a time of vehicle frontal collision, and displacing the at least one of the arms in the vehicle width direction.

3. The vehicle front portion structure recited in claim 2, wherein a break start point, which is a starting point of breakage in a case in which an external force acts in the vehicle width direction, is formed at the at least one of the arms.

4. The vehicle front portion structure recited in claim 2, wherein:
- the projection extends from the mount main body portion towards one side in the vehicle width direction, and
- of the left-right pair of arms, one of the arms, which faces the projection in the vehicle front-rear direction, extends further toward the vehicle rear side than another of the arms.

5. The vehicle front portion structure recited in claim 2, wherein:
- a cut-out part is formed at a lower part of the mount main body portion, and
- a gear box is disposed at the cut-out part.

\* \* \* \* \*